US012702877B2

(12) United States Patent
Sulc et al.

(10) Patent No.: US 12,702,877 B2
(45) Date of Patent: Aug. 11, 2026

(54) SHOCK ABSORBER FOR FALL PROTECTION LOCKING SYSTEM

(71) Applicant: HONEYWELL SAFETY PRODUCTS USA, INC., Charlotte, NC (US)

(72) Inventors: David Sulc, Jedovnice (CZ); Vaclav Hruza, Brno (CZ); Radim Svoboda, Bojkovice (CZ)

(73) Assignee: Honeywell Safety Products USA, Inc., Latham, NY (US)

( * ) Notice: Subject to any disclaimer, the term of this patent is extended or adjusted under 35 U.S.C. 154(b) by 603 days.

(21) Appl. No.: 18/190,813

(22) Filed: Mar. 27, 2023

(65) Prior Publication Data

US 2023/0233889 A1 Jul. 27, 2023

Related U.S. Application Data

(62) Division of application No. 16/831,326, filed on Mar. 26, 2020, now Pat. No. 11,642,554.

(51) Int. Cl.
*A62B 35/04* (2006.01)
*A62B 35/00* (2006.01)
(Continued)

(52) U.S. Cl.
CPC .......... *A62B 35/04* (2013.01); *A62B 35/0081* (2013.01); *B29C 70/00* (2013.01); *F16D 63/008* (2013.01)

(58) Field of Classification Search
CPC . A62B 35/04; A62B 35/0093; A62B 35/0081; A62B 35/0075; F16D 63/008;
(Continued)

(56) References Cited

U.S. PATENT DOCUMENTS 5,799,760 A * 9/1998 Small .................... A62B 35/04 267/155
6,457,556 B1 10/2002 Skade et al.
(Continued)

FOREIGN PATENT DOCUMENTS

DE 202016107348 U1 1/2017
KR 20190098596 A * 8/2019 ......... E06B 9/17076
WO WO-2011049674 A1 * 4/2011 ............. A62B 35/04

OTHER PUBLICATIONS

Ex Parte Quayle Action Mailed on Oct. 14, 2022 for U.S. Appl. No. 16/831,326.

(Continued)

*Primary Examiner* — Robert A. Siconolfi
*Assistant Examiner* — Mahbubur Rashid
(74) *Attorney, Agent, or Firm* — Fredrikson & Byron, P.A.

(57) ABSTRACT

Locking systems and method of manufacturing the same are provided. A locking system for fall protection includes a braking lever. The braking includes a shock absorber. The shock absorber includes a plurality of coils. The shock absorber also includes a plurality of breakaway interfaces coupling the plurality of coils together. Each of the plurality of breakaway interfaces are configured to decouple two of the plurality of coils at a different force. At least one of the breakaway interfaces defines at least one deformable finger defined on one of the plurality of coils of the shock absorber interfacing with another coil of the shock absorber.

11 Claims, 10 Drawing Sheets

(51) Int. Cl.
*B29C 70/00* (2006.01)
*F16D 63/00* (2006.01)

(58) Field of Classification Search
CPC ... B29C 70/00; F16F 7/003; F16F 7/12; F16F 7/123; F16F 7/128
See application file for complete search history.

(56) References Cited

U.S. PATENT DOCUMENTS

| | | | | |
|---|---|---|---|---|
| 8,550,225 | B2 | 10/2013 | Blomberg et al. | |
| 8,584,797 | B2 | 11/2013 | Krauss | |
| 9,132,297 | B2 | 9/2015 | Casebolt et al. | |
| 9,168,402 | B2 | 10/2015 | Casebolt et al. | |
| 9,636,528 | B2 | 5/2017 | Casebolt et al. | |
| 10,047,560 | B2 * | 8/2018 | Roth | A62B 35/0081 |
| 10,137,323 | B2 | 11/2018 | Roth | |
| 11,406,851 | B2 * | 8/2022 | Novotny | A62B 1/14 |
| 2009/0133977 | A1 * | 5/2009 | Warren | F16F 7/003 188/371 |
| 2011/0094839 | A1 * | 4/2011 | Blomberg | A62B 35/04 219/121.72 |
| 2014/0020983 | A1 * | 1/2014 | Casebolt | A62B 35/0081 182/241 |
| 2021/0128955 | A1 | 5/2021 | Marak et al. | |

OTHER PUBLICATIONS

Notice of Allowance and Fees Due (PTOL-85) Mailed on Jan. 9, 2023 for U.S. Appl. No. 16/831,326.
Requirement for Restriction/Election Mailed on Jun. 10, 2022 for U.S. Appl. No. 16/831,326.

* cited by examiner

SHOCK ABSORBER FOR FALL PROTECTION LOCKING SYSTEM

CROSS-REFERENCE TO RELATED APPLICATION

This application is a divisional of U.S. application Ser. No. 16/831,326, filed Mar. 26, 2020, the contents of which as are incorporated herein by reference in its entirety.

TECHNOLOGICAL FIELD

An example embodiment relates generally to fall protection systems and, more particularly, to fall protection locking systems.

BACKGROUND

From recreation to survival devices, fall protection devices are instrumental in preserving the safety of users during traversal of uncertain conditions and heights. In order to operate effectively, protection devices must be capable of withstanding the weight of a user during a fall instance. Applicant has identified a number of deficiencies and problems associated with current fall protection devices. Through applied effort, ingenuity, and innovation, many of these identified problems have been solved by the methods and apparatus of the present disclosure.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a locking system for fall protection is provided. The locking system includes a braking lever. The braking lever includes a shock absorber. The shock absorber includes a plurality of coils. The shock absorber also includes a plurality of breakaway interfaces coupling the plurality of coils together. Each of the plurality of breakaway interfaces are configured to decouple two of the plurality of coils at a different force. At least one of the breakaway interfaces defines at least one deformable finger defined on one of the plurality of coils of the shock absorber interfacing with another coil of the shock absorber.

In some embodiments, the locking system also includes a housing. In such an embodiment, the housing defines a guide path through which the housing is slideably attached to a guide member. In some embodiments, the braking lever also includes a braking end that is configured to engage the guide member. In some embodiments, at least one breakaway interface includes a clipping mechanism configured to increase the force at which the shock absorber deforms. In some embodiments, the clipping mechanism is configured to fit around at least one coil of the shock absorber, such that the clipping mechanism resists the opening force of the shock absorber. In some embodiments, the at least one breakaway interface including the clipping mechanism further includes a clip aperture configured to receive the clipping mechanism. In some embodiments, the clipping mechanism is removable.

In some embodiments, the plurality of coils are made out of a single coiled material. In some embodiments, at least one of the breakaway interface includes two hooks defined on adjacent coils, such that each of the two hooks are configured to withstand a predetermined force at which the hook decouples. In some embodiments, the shock absorber includes at least a first breakaway interface defines at least one deformable finger defined on one of the plurality of coils of the shock absorber interfacing with another coil of the shock absorber; a second breakaway interface defines two hooks on adjacent coils, such that each of the two hooks are configured to withstand a predetermined force at which the hook decouples; and a third breakaway interface defines a clipping mechanism configured to increase the force at which the shock absorber deforms, wherein each of the first breakaway interface, the second breakaway interface, and the third breakaway interface are configured to decouple at a different force.

In another example embodiment a method of manufacturing a locking system for fall protection is provided. The method includes providing a shock absorber on a braking lever. The method of manufacturing the shock absorber includes creating a plurality of coils by bending a material over itself. The method of manufacturing the shock absorber also includes coupling the plurality of coils together by coupling a plurality of breakaway interfaces. Each of the plurality of breakaway interfaces are configured to decouple two of the plurality of coils at a different force and at least one of the breakaway interfaces defines at least one deformable finger defined on one of the plurality of coils of the shock absorber interfacing with another coil of the shock absorber.

In some embodiments, the method of manufacturing a locking system also includes providing a housing. In such an embodiment, the housing defines a guide path through which the housing is slideably attached to a guide member. In some embodiments, the method of manufacturing the braking lever further includes a braking end that is configured to engage the guide member. In some embodiments, at least one breakaway interface includes a clipping mechanism configured to increase the force at which the shock absorber deforms. In some embodiments, the clipping mechanism is configured to fit around at least one coil of the shock absorber, such that the clipping mechanism resists the opening force of the shock absorber. In some embodiments, the at least one breakaway interface including the clipping mechanism further includes a clip aperture configured to receive the clipping mechanism. In some embodiments, the clipping mechanism is removable.

In some embodiments, the plurality of coils are made out of a single coiled material. In some embodiments, at least one of the breakaway interface includes two hooks defined on adjacent coils, such that each of the two hooks are configured to withstand a predetermined force at which the hook decouples. In some embodiments the shock absorber includes at least a first breakaway interface defines at least one deformable finger defined on one of the plurality of coils of the shock absorber interfacing with another coil of the shock absorber; a second breakaway interface defines two hooks on adjacent coils, such that each of the two hooks are configured to withstand a predetermined force at which the hook decouples; and a third breakaway interface defines a clipping mechanism configured to increase the force at which the shock absorber deforms, wherein each of the first breakaway interface, the second breakaway interface, and the third breakaway interface are configured to decouple at a different force.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1A:
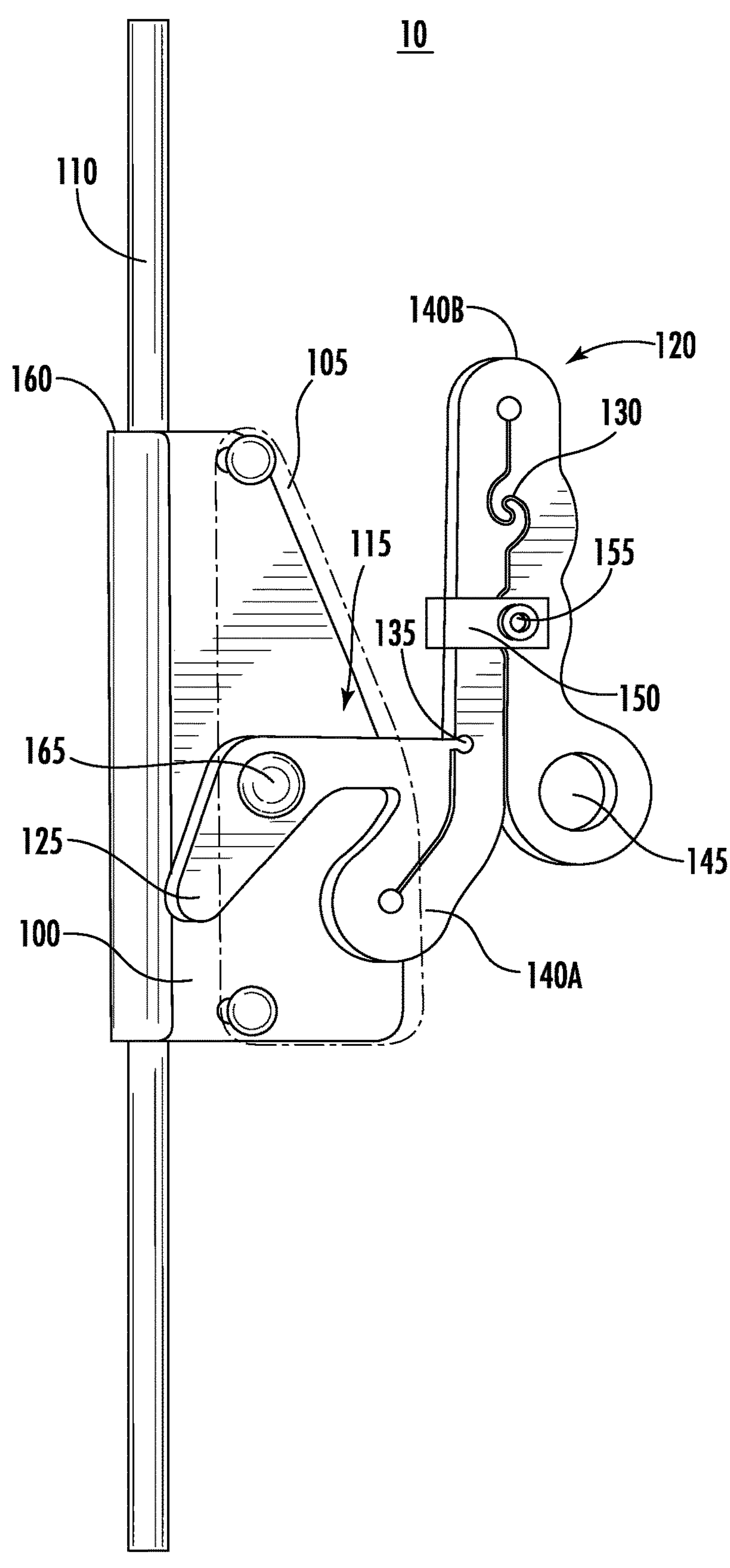
Figure 1B:
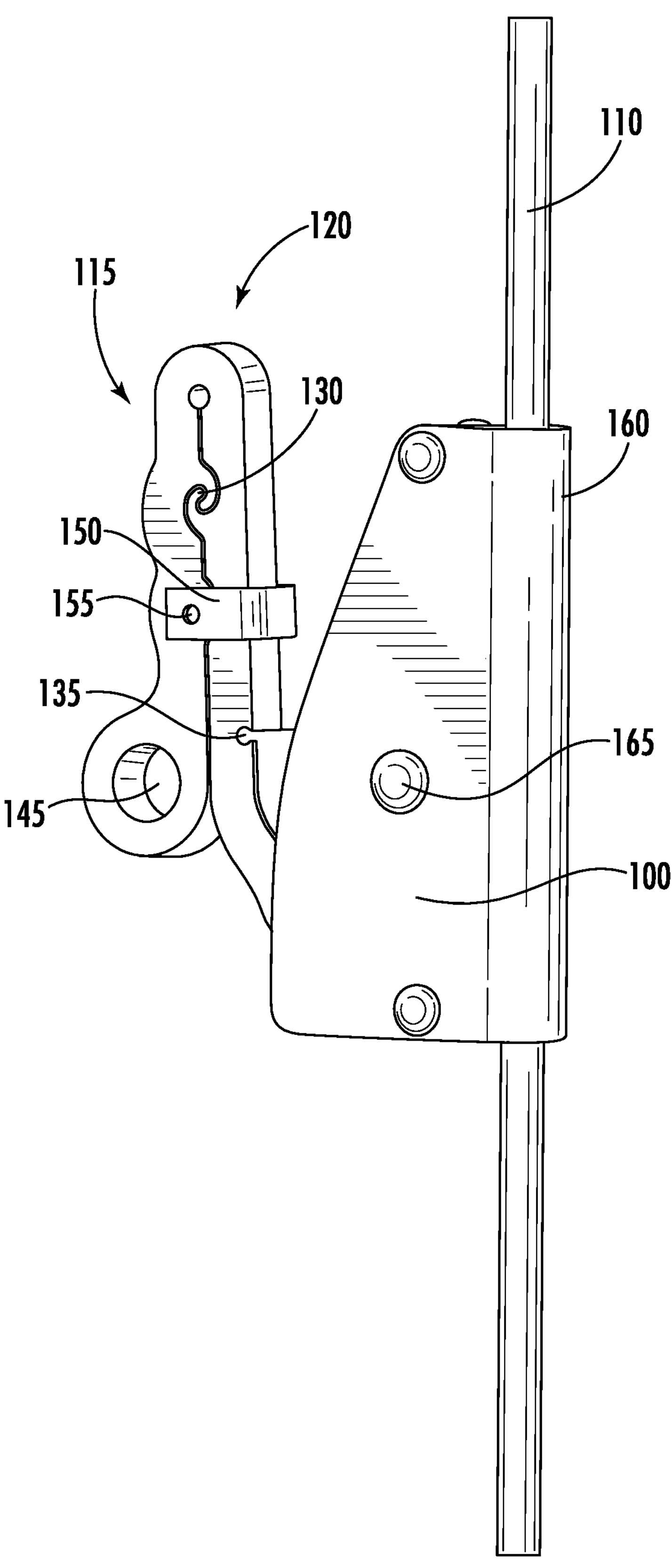
Figure 2A:
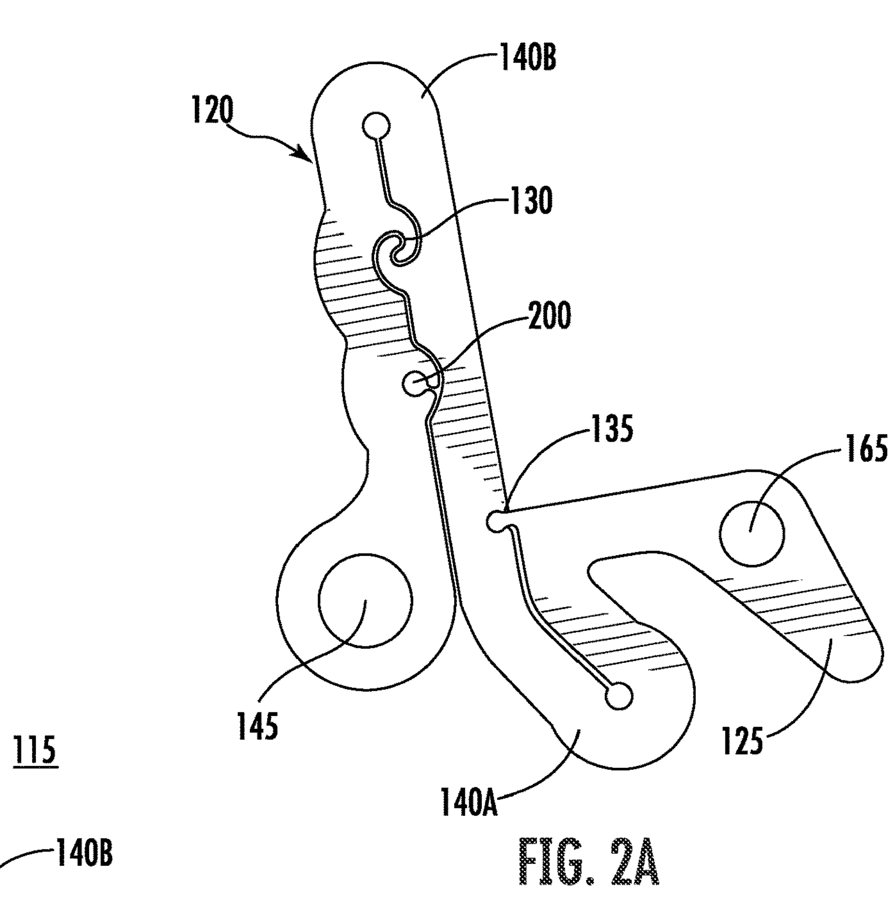
Figure 2B:
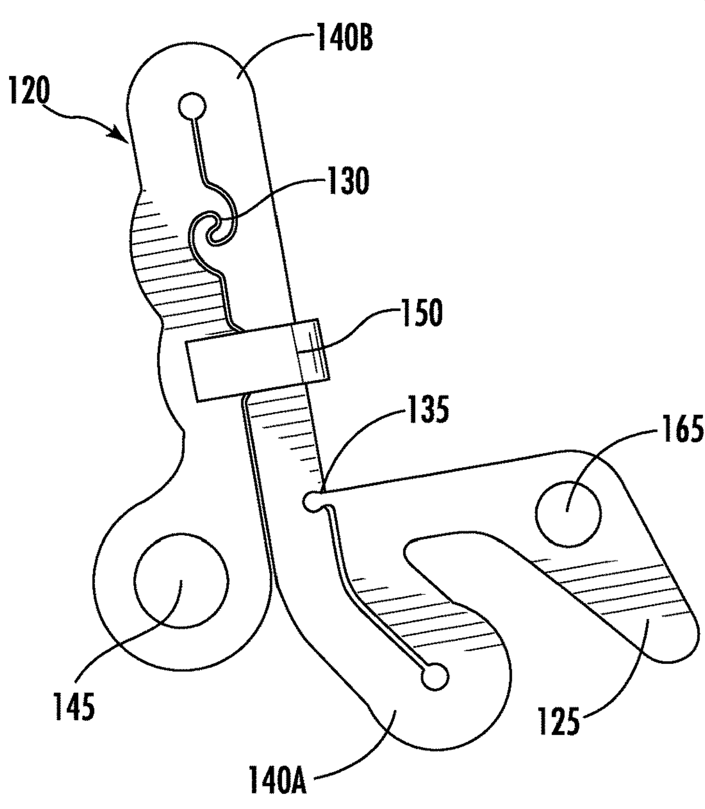
Figure 3:
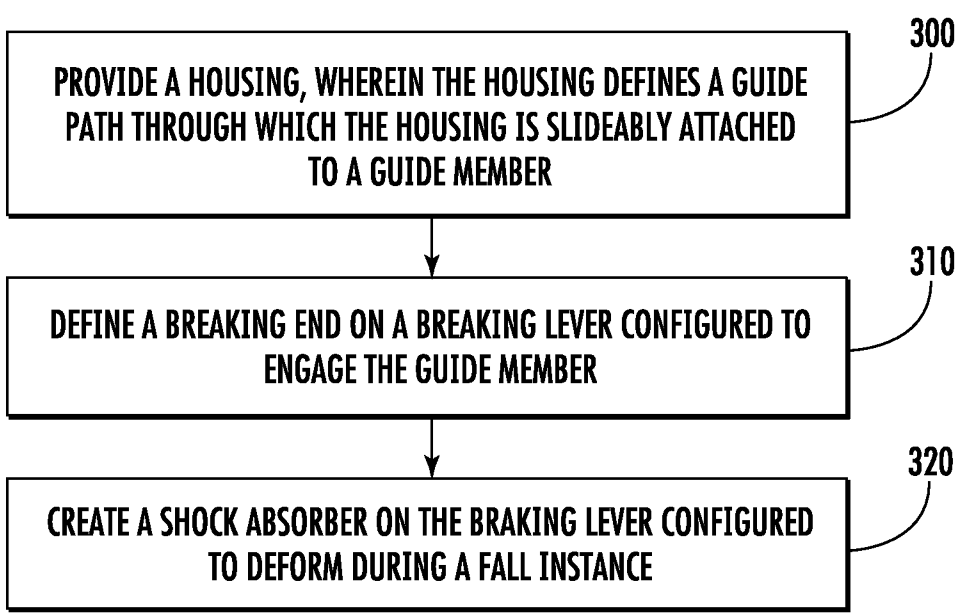
Figure 4A:
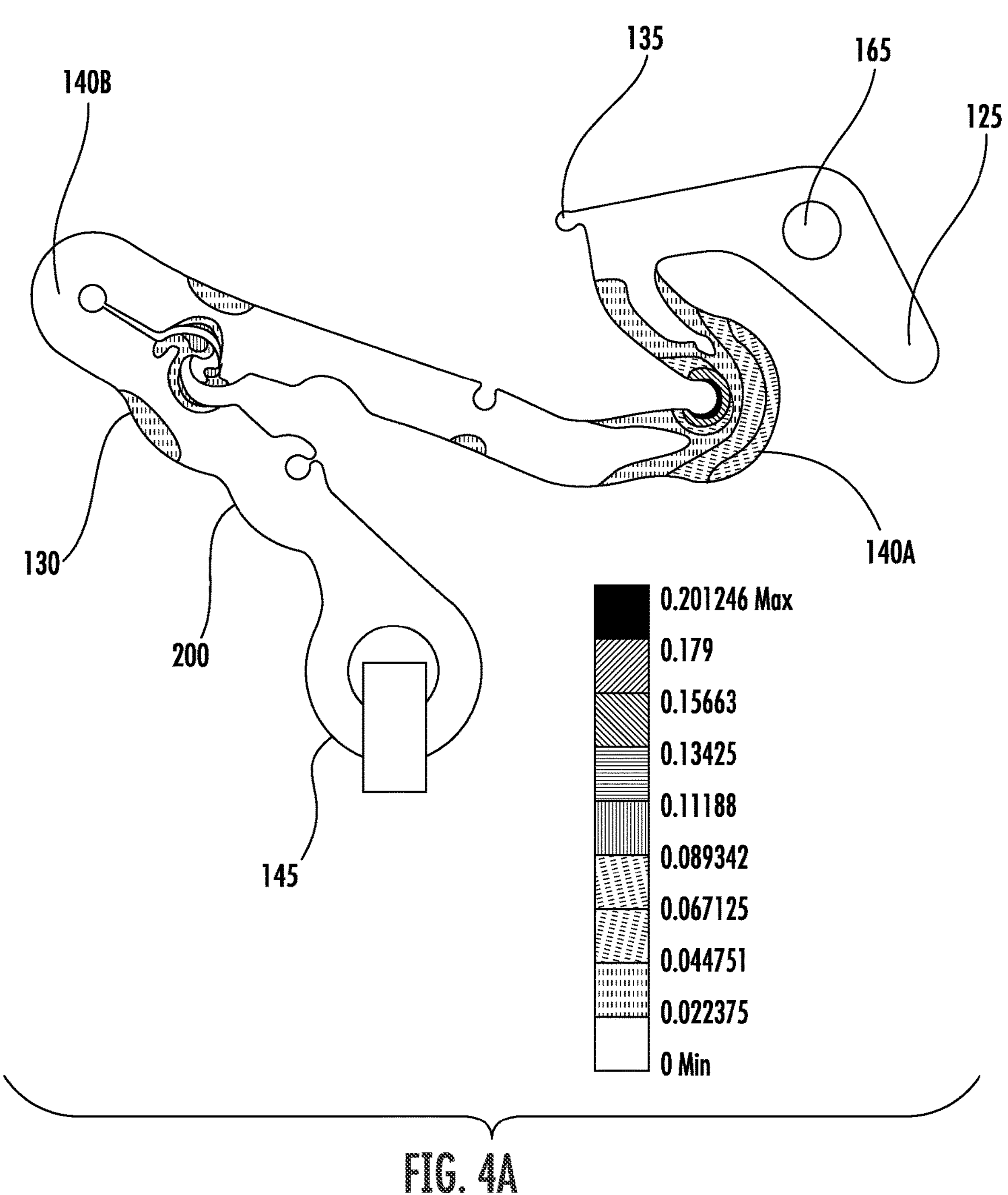
Figure 4B:
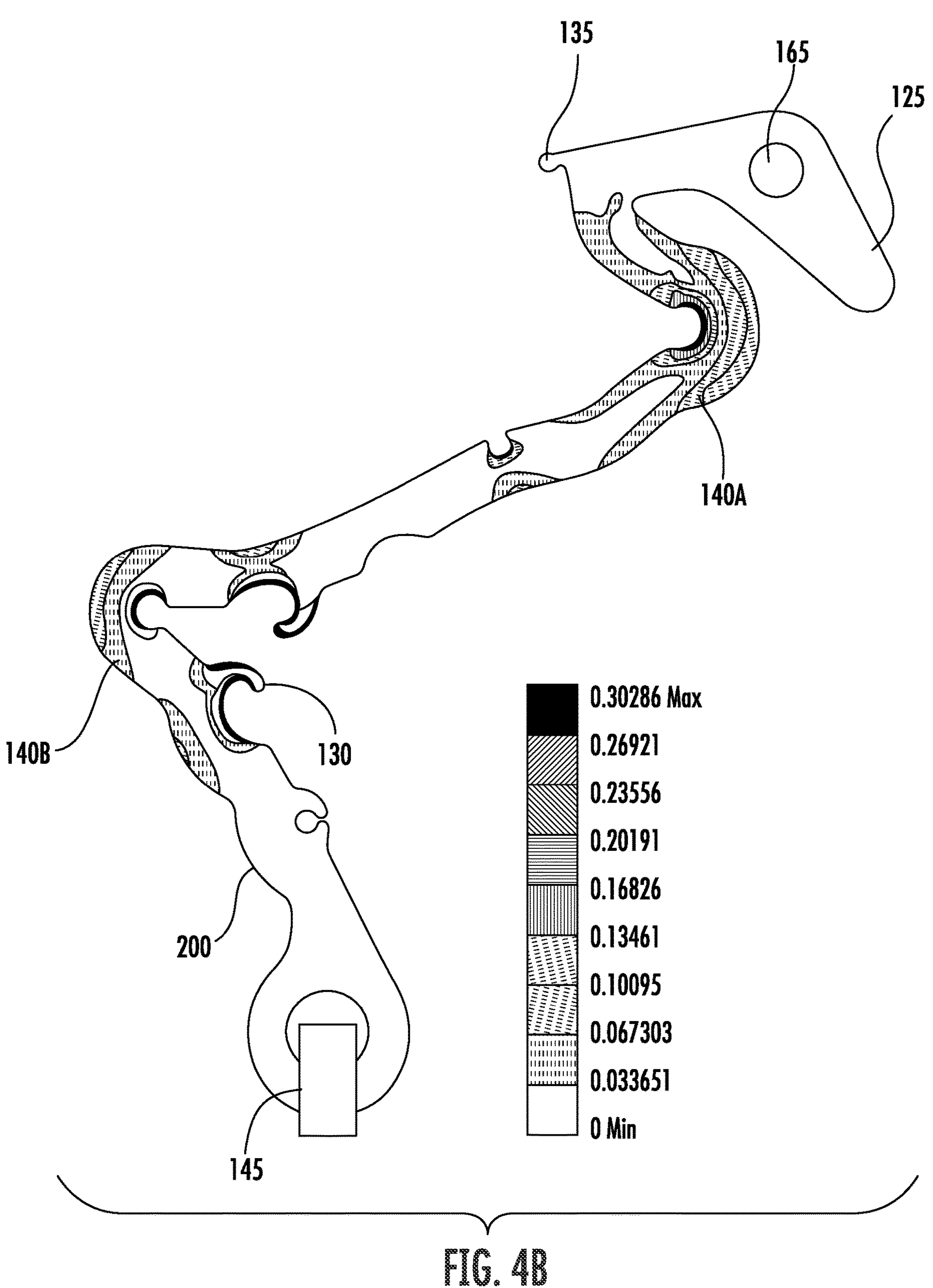
Figure 4C:
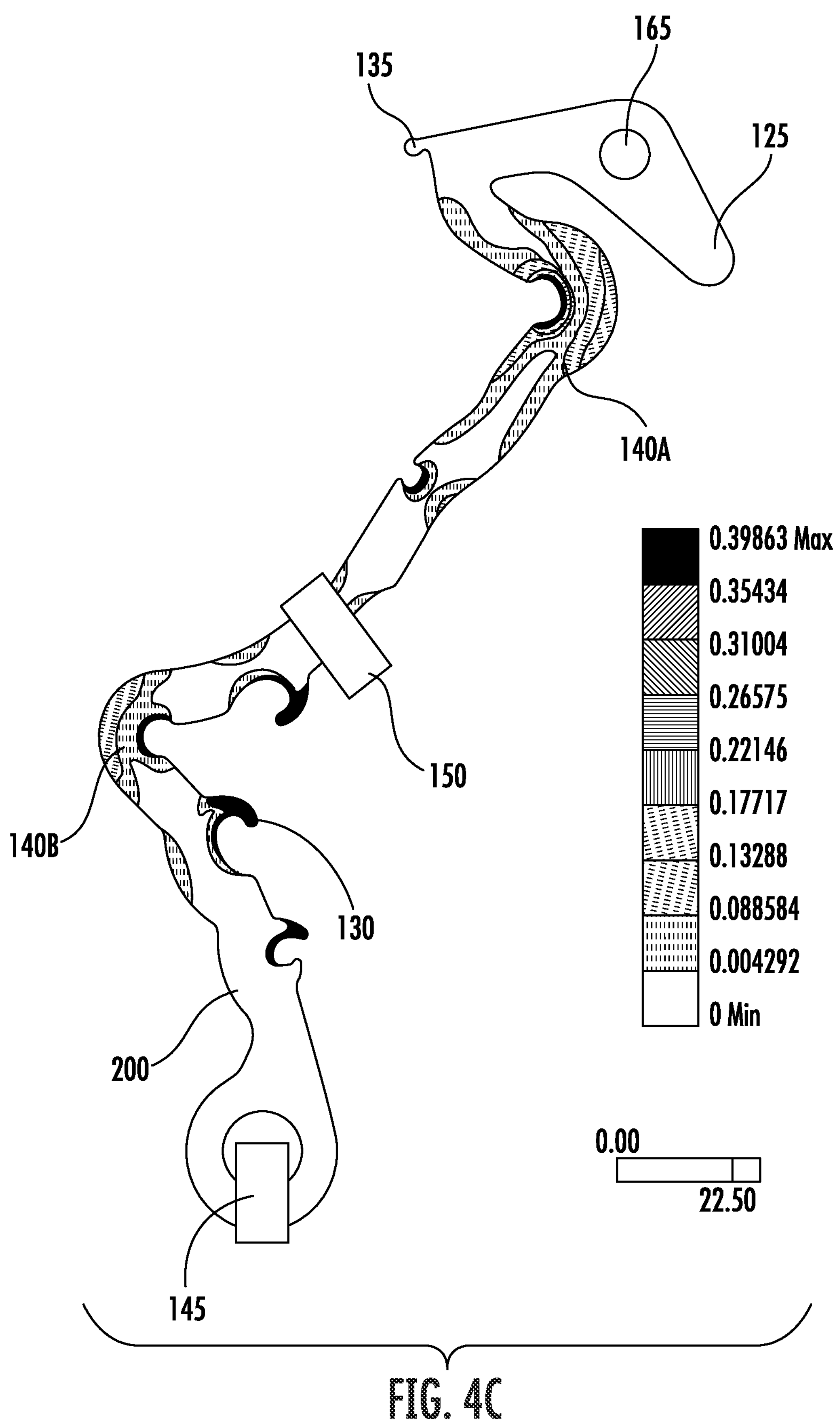
Figure 4D:
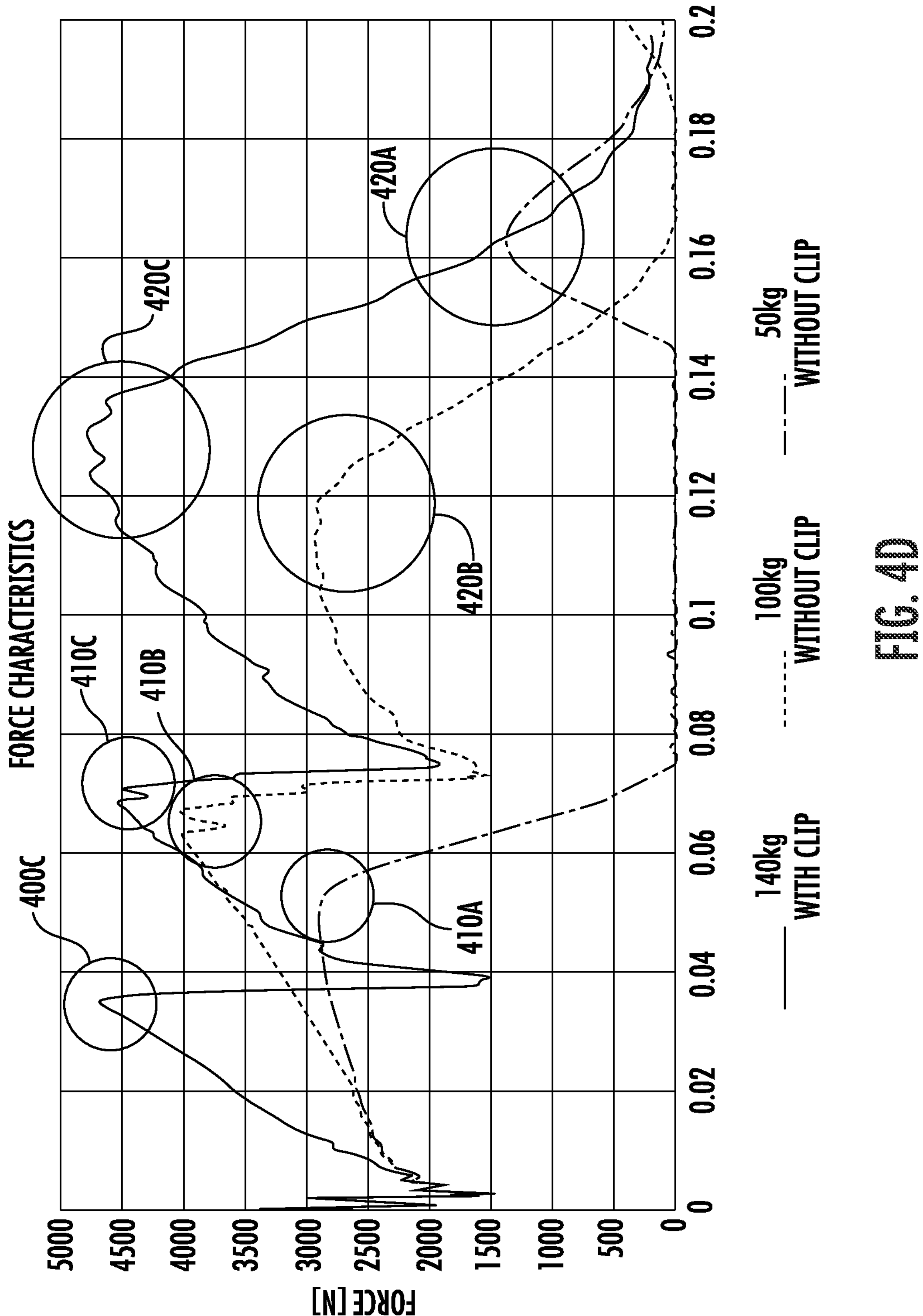
Figure 5:
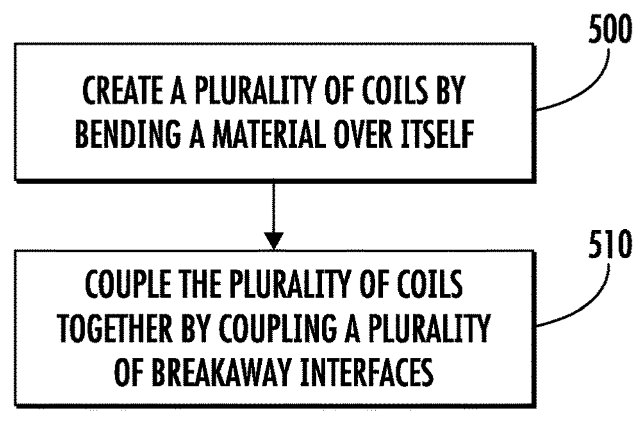
Figure 6A:
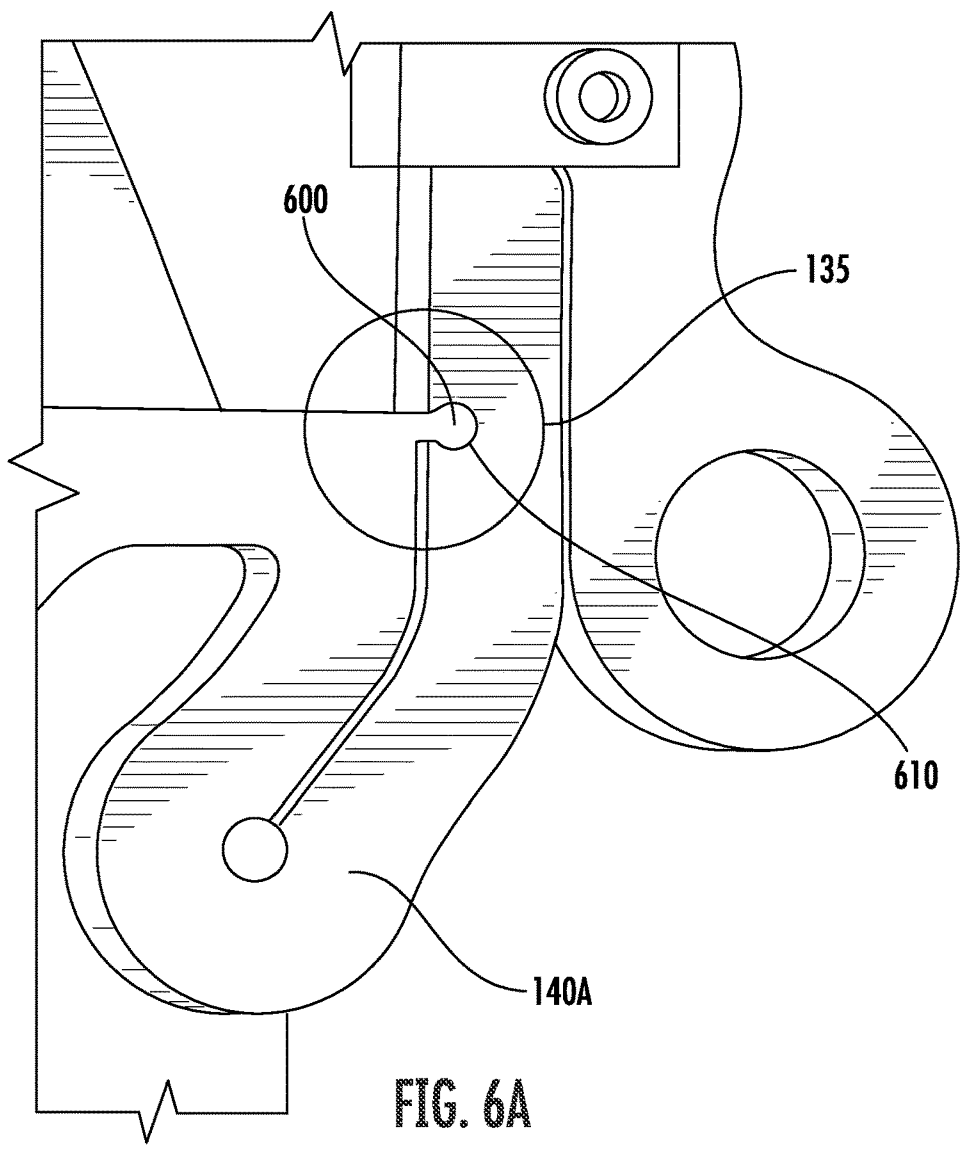
Figure 6B:
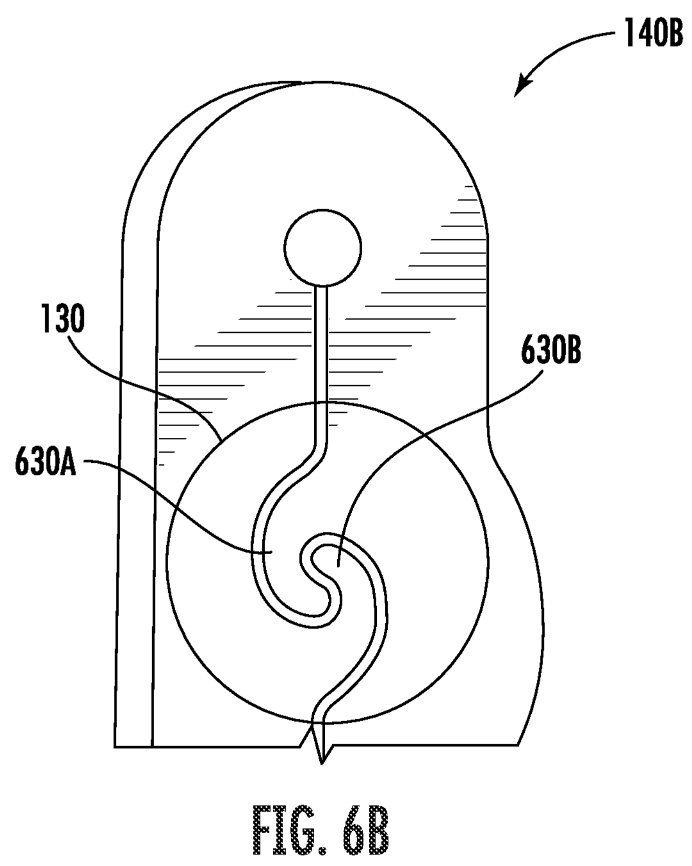
Figure 6C:
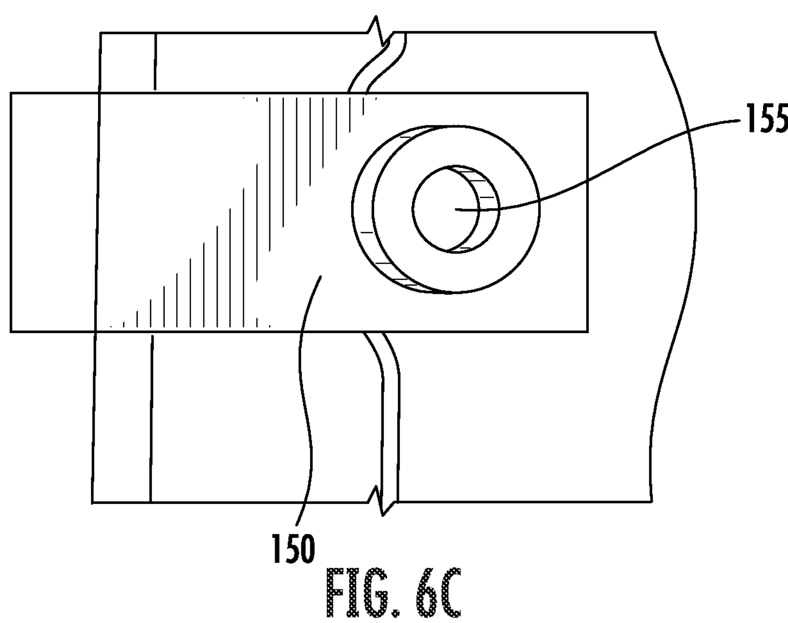

Having thus described certain example embodiments of the present disclosure in general terms, reference will hereinafter be made to the accompanying drawings, which are not necessarily drawn to scale, and wherein:

FIGS. 1A and 1B are a side views of the locking system with a clipping mechanism installed in the accordance with an example embodiment of the present disclosure;

FIG. 2A is a side view of shock absorber without the clipping mechanism equipped in the accordance with an example embodiment of the present disclosure;

FIG. 2B is a side view of shock absorber without the clipping mechanism equipped in the accordance with an example embodiment of the present disclosure;

FIG. 3 is a flowchart of a method of manufacturing a locking system in accordance with the present disclosure;

FIGS. 4A-4C are examples of the deformation of a shock absorber of various embodiments under different forces in accordance with the present disclosure;

FIG. 4D is a graph showing the forces on the shock absorber during the deformation shown in FIGS. 4A-4C in accordance with the present disclosure;

FIG. 5 is another flowchart of a method of manufacturing a locking system in accordance with the present disclosure; and FIG. 6A-6C are example breakaway interfaces of various embodiments.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

In some examples, a shock absorber, which is a form of personal protective equipment (PPE), is device that reduces or otherwise eliminates a force (e.g., a braking force) impact of a fall arrester on a user in a fall condition. In some examples, standards note that a maximal braking force is not to exceed 6 kN-8 kN. In some examples, force in range less than 6 kN is optimal for user's weight around 100 kg. Equally importantly, and in some example systems herein are configured to also reduce acceleration. In some examples, the systems described herein may reduce acceleration to under 6 kN for whole body mass range (from 50 to 140 kg).

Additionally or alternatively, example embodiments of the present disclosure provides various example locking systems to allow for, in some examples, effective operation with improved operation during fall situations. Various example embodiments alternatively or additionally allow for an increase in force capacity for a fall device using only minor additional components. As such, various embodiments of the shock absorber discussed herein allow for variable weight capacity (e.g., maximum weight for users during operation) using the same shock absorber.

Various example embodiments of the present disclosure allow, in some examples, for streamlined manufacturing and cost reduction based on the reduced need for unique shock absorber designs to withstand different loads. Specifically, example embodiments described herein provide for a clipping mechanism to be attached to the shock absorber, such that the force at which the shock absorber deforms increases, thereby increasing the weight capacity of a locking system using such as a shock absorber. Advantageously, the same or substantially the same shock absorber may be used for various weight capacities and a clipping mechanism may be introduced for higher weight capabilities. As such, the materials needed for a high-weight capacity shock absorber may be reduced, in some examples, by using the clipping mechanism to use the same shock absorber typically used for smaller weight capacity.

Advantageously and in some examples, the system described herein may take the form of multiple different configurations based on at least user weight. For example, systems described herein may be designed for example weight limits of 50 kg, 100 kg and 140 kg. Irrespective of the multiple configurations, if a user's weight is within a predetermined range of an upper weight limit, a clipping mechanism, which in some examples may provide additional stiffness for increased shock absorption may be used. In some examples, the clipping mechanism may provide an improving braking distance for each of the multiple different configurations.

FIGS. 1A and 1B illustrate opposite side views of the locking system 10, while FIG. 1A illustrates a perspective view of the locking system 10 with a transparent cover plate 105 to allow the braking lever 115 to be seen. In various embodiments, the locking system 10 may include a braking lever 115, a housing 100, and a cover plate 105. Various different components of a locking system may be included unless otherwise stated.

A braking lever 115 may be rotatably connected to at least one of the housing 100 and the cover plate 105. The braking lever 115 may include a shock absorber 120 and a braking end 125. The shock absorber 120 and the braking end 125 may be defined at opposite side of an attachment point 165. A connection point 145, such as a carabiner, may be securely fastened to the braking lever 115 at an attachment end, such that when a force is applied to the connection point 145, the force causes the rotation and, in some instances, deformation of the braking lever 115. The connection point 145 is configured to be directly or indirectly connected to a user (e.g., a user may be connected to a carabiner attached to the connection point 145). The braking end 125 of the braking lever 115 may be configured to engage with the guide member 110 during a fall instance. As such, the braking end 125 may define an engagement surface configured to engage with the guide member 110 and slow down the movement of the locking system 10. In various embodiments, the guide member 110 may be a cable, a rail, a rope, and/or the like used for fall protection.

In some examples, the braking lever 115 may include the shock absorber 120 configured with a plurality of pins or other coupling mechanisms that are operably coupled together during typical operation. In FIGS. 1A and 1B, the shock absorber 120 of the braking lever 115 is illustrated before a fall situation and/or before any deformation occurs. In some embodiments, the shock absorber 120 of the braking lever 115 may be a portion of the braking lever that is coiled or bent upon itself and uses various breakaway interfaces (e.g., breakaway interfaces 130, 135) to hold the shock absorber 120 together during typical operation. As shown by breakaway interfaces (e.g., breakaway interfaces 130, 135), the braking lever 115 may be coiled and/or bent in such a way (e.g., bends 140A, 140B) that in an instance in which a force upon the braking lever exceeds a certain threshold, the breakaway interfaces 130, 135, and 150 in an instance in which the clipping mechanism is equipped, may be urged to decouple.

FIG. 6A shows an up-close view of the breakaway interface 135. As shown, the shock absorber 120 may define a deformable finger 600 that is to be received by a finger receiving aperture 610, such that during non-fall instances, the deformable finger 600 is received the finger receiving aperture 610 holding the adjacent coils together (e.g., maintaining bend 140B). In various embodiments, as a fall instance occurs, the coil having the finger receiving aperture 610 may be pulled away from the coil with the deformable finger 600 until a sufficient force has been reached to pull the finger 600 out of the finger receiving aperture 610. In various embodiments, multiple breakaway interfaces may be provided using the deformable finger 600 and finger receiving aperture 610 approach as shown at breakaway interface 130.

FIG. 6B shows an up-close view of the breakaway interface 130. As shown, the shock absorber 120 may define two hooks on adjacent coils, such that each hook 630A, 630B may receive the other and hold the bend 140A together during a non-fall instance. In various embodiments, as a fall instance occurs, the adjacent coils may be pulled away from one another until a sufficient force has been reached to decouple the hooks 630A, 630B. In some embodiments, the breakaway interface 130 may decouple at an instance in time after the breakaway interface 135 decouples. In various embodiments, multiple breakaway interfaces may be provided using the multiple hook approach as shown in breakaway interface 130. In an example embodiment with the shock absorber 120 shown in FIG. 1A, the breakaway interface 130 may not experience enough opening force to decouple until the breakaway interface 135 has decoupled.

FIG. 6C shows an up-close view of the clipping mechanism 150 which when equipped may act as another breakaway interface. As shown, in FIG. 2A, the shock absorber 120 may define a clip aperture 200. In some embodiments, the clip aperture 200 may be configured to receive a clip attachment mechanism 155. In various embodiments, the clip attachment mechanism 155 may hold the clipping mechanism 150 in place during operation. In various embodiments, the clipping mechanism 150 may be positioned such that the clipping mechanism 150 holds one or more of the coils together. As such, in an instance in which the clipping mechanism is equipped, the force to deform the shock absorber 120 is increased over an instance in which there is no clipping mechanism. In various embodiments, the clipping mechanism 150 may be removable (e.g., as shown, the clipping mechanism 150 may be attached to the shock absorber 120 via a clip attachment mechanism 155 (e.g., a screw, a bolt, split pin, pin with retaining ring, or the like). For example, a female thread of a bolt may be received directly by the clipping mechanism 150 and another example the clipping mechanism 150 may have no threading and use standard nut.

In various embodiments, the clipping mechanism 150 may be configured to be attached at a certain weight capacity based on the design of the shock absorber 120. Additionally, the weight capacity for which the clipping mechanism 150 is equipped may include a safety factor (e.g., it may be recommended to equip the clipping mechanism 150 for a 120 kg user even in an instance in which the shock absorber 120 without the clipping mechanism 150 may have been safe for the user). In various embodiments, the thickness of each coil may be different in order to promote the detachment of one breakaway interface before another. In an example embodiment, the clipping mechanism 150 may be attached to the example shock absorber 120 in an instance in which the weight of a user is greater than 120 kg. In an example embodiment, the clipping mechanism 150 may be attached to the example shock absorber 120 in an instance in which the weight of a user is greater than 130 kg. In an example embodiment, the clipping mechanism 150 may be attached to the example shock absorber 120 in an instance in which the weight of a user is greater than 140 kg. In various embodiments, the clipping mechanism 150 may be attached at different weights based on the design of the shock absorber (e.g., different shock absorbers may deform at different weights). In various embodiments, multiple clipping mechanism 150 may be used to increase the adjustability of the shock absorber.

As the shock absorber 120 begins to withstand a load from the connection point 145 (e.g., a downward force in an instance a fall situation is occurring), the shock absorber 120 may begin to deform. In various embodiments, the force applied is considered to be a downward force upon the connection point 145 and does not necessarily include any horizontal forces. In some embodiments, the shock absorber 120 may also deform in an instance a horizontal force is applied. In some embodiments, the shock absorber 120 may be configured to withstand more vertical (e.g., downward) force than horizontal force.

As is shown in FIG. 1A, the cover plate 105 may be positioned opposite to the housing 100 and is configured to cover at least a portion of one or more components of locking system. The cover plate 105 is secured to the housing 100 using one or more bolts, rivets, pins, or the like. In various embodiments, the housing 100 and the cover plate 105 may form a unitary piece. In various embodiments, the locking system 10 may include at least a braking lever 115 and a housing 100. Various other components of a locking system 10 may also be provided. In various embodiments, the locking system 10 may move between a unlocked position, wherein the locking system 10 travels along the guide member 110 with minimal resistance, and a locked position, wherein the locking system 10 (e.g., the braking end 125 of the braking lever 115) engages with the guide member to restrict and/or stop motion of the locking system 10 along the guide member 110. As the braking end 125 engages with the guide member 110, the downward force applied to the locking system 10 may be applied to the shock absorber 120, such that at a predetermined force, the shock absorber 120 may begin to deform.

FIGS. 2A and 2B illustrate the same braking lever configured for different weight capacities. As shown, FIG. 2A shows the braking lever 115 without a clipping mechanism 150. As shown, a clip aperture 200 may be defined on the shock absorber 120, such that a clipping mechanism 150 may be added to increase the load capacity, as shown in FIG. 2B. In various embodiments, the weight capacity of the shock absorber 120 may be based on the configuration of the shock absorber itself. For example, while the shock absorber 120 is illustrated with breakaway interfaces 130, 135, various shock absorbers of the present disclosure may employ different shapes, materials, and/or hooking interfaces, such that the weight capacity is changed. In various embodiments, the clipping mechanism 150 may hold two or more coils together such that the shock absorber 120 capacity may increase. For example, the shock absorber 120 shown in FIG. 2A may have a weight capacity of 100 kilograms (kg) in an instance in which the clipping mechanism 150 is not equipped. Additionally, for example, the same shock absorber with the clipping mechanism 150 equipped, as shown in FIG. 2B, may have a weight capacity of 140 kg or more. In various embodiments, multiple clipping mechanism may be provided to increase the stiffness of the shock absorber.

FIG. 3 is a flowchart illustrating a method of manufacturing a locking system in accordance with various embodiments of the present disclosure. Referring now to Block 300 of FIG. 3, the method of manufacturing a locking system may include providing a housing. In various embodiments, the housing defines a guide path through which the housing is slideably attached to a guide member. In various embodiments, a cover plate 105 may also be provided. In various embodiments, the cover plate 105 may be positioned opposite to the housing 100 and is configured to cover at least a portion of one or more components of locking system. The cover plate 105 is secured to the housing 100 using one or more bolts, rivets, pins, or the like. In various embodiments, the housing 100 and the cover plate 105 may form a unitary piece. As discussed above, a guide path portion 160 of the housing 100 may be bent to allow for a guide member 110 to be received therein.

Referring now to Block 310 of FIG. 3, the method of manufacturing a locking system may also include defining a braking end 125 on a braking lever 115 being configured to engage the guide member 110. In various embodiments, the braking lever 115 may be rotatably attached to the housing 100 (e.g., via attachment point 165). In various embodiments, additional components, such as a spring, may be provided to resist the rotation of the braking lever during operation, such that the braking end 125 of the braking lever 115 may not engage with the guide member 110 during non-fall instances (e.g., normal operations). As such, during non-fall instances, the locking system 10 may travel freely along the guide member 110 until a sufficient force is exerted on the connection point 145 (e.g., the downward force of a person attached to the locking system falling down) to cause the braking lever 115 to rotate such that the braking end 125 engages with the guide member 110. For example, in some embodiments, the locking system 10 may include a damping component (not shown) configured with a spring to dissipate the rotational force of the braking lever 115 (e.g., to avoid the braking lever from damaging and/or breaking the guide member 110). As such and in an instance the locking system 10 is in the unlocked position, the damping component may be provide resistance to the rotational motion of the braking lever 115.

Referring now to Block 300 of FIG. 3, the method of manufacturing a locking system may also include creating a shock absorber 120 on the braking lever 115 configured to deform during a fall instance. In various embodiments, the shock absorber 120 may be created by coupling a coiled material together (e.g., bends 140A, 140B) with one or more breakaway interfaces (e.g., breakaway interfaces 130, 135), such that each of the one or more hooks is configured to withstand a predetermined force at which the hook decouples. In various embodiments, the shock absorber 120 may be created by coupling a coiled material together with at least two hooking interfaces 130, such that each of the at least two hooking interfaces is configured to withstand a predetermined force at which the hook decouples. In various embodiments, the shock absorber 120 may be configured to permanently deform in an instance in which the predetermined force decouples the one or more hooks.

In various embodiments, the shock absorber 120 may include a clipping mechanism 150 configured to increase the force at which the shock absorber deforms. In various embodiments, a clip aperture 200 may be defined on the shock absorber configured to receive the clipping mechanism. In various embodiments, the clipping mechanism 150 may be configured to wrap around one of the coils and engage with a clip aperture 200, such that the clipping mechanism 150 resists the movement of the two coils away from one another (e.g., resists deformation of the shock absorber). In various embodiments, the clipping mechanism 150 may be removeable (e.g., removably attached via the clip attachment mechanism 155). In some embodiments, the clipping mechanism 150 may be configured to fit around at least one coil of the shock absorber, such that the clip resists the opening force of the shock absorber 120. In various embodiments, in an instance in which the clipping mechanism 150 is equipped on the shock absorber 120, the predetermined force at which the hooks decouple increases for at least one hooking interface 130. In various embodiments, there may be more than one clipping mechanisms 150, or alternatively, there may be more than one clip apertures 200, such that clipping mechanisms 150 may be added individually allowing for increased customization of the shock absorber 120. For example, each added clipping mechanism 150 may incrementally increase the weight capacity of a locking system 10 and therefore a multiple clipping mechanisms could allow for more options for weight capacity (e.g., a based weight capacity would be an instance in which there are no clipping mechanisms equipped and the weight capacity may increase for each clipping mechanism equipped).

FIG. 4A-4C illustrates the deformation of a shock absorber during different forces being experienced. FIG. 4A shows the deformation of the shock absorber of an example embodiment without a clipping mechanism and with a 50 kg weight. FIG. 4B shows the deformation of the shock absorber of an example embodiment with no clipping mechanism with a 100 kg weight. FIG. 4C shows the deformation of the shock absorber of an example embodiment with the clipping mechanism equipped with a 140 kg weight. As shown, the shock absorber 120 begins to deform with no clipping mechanism. For example, the breakaway interfaces 135 has disengaged, while the hooking interface 130 has begun to decouple, but remains engaged. As such, the bend 140A has already began to straighten, while there is minimal opening of the bend 140B (e.g., bend 140A was held together by the breakaway interfaces 135). When the same shock absorber 120 experiences a 100 kg weight, the hooking interface 130 has disengaged and decoupled, allowing the shock absorber to further uncoil. As such, the bend 140B has begun to open (e.g., bend 140B was held together by hooking interface 130). FIG. 4C shows the deformation of the same shock absorber 120, equipped with a clipping mechanism 150. As shown, even though the weight was increased by 50 kg, the deformation of the shock absorber 120 was similar to the deformation shown in FIG. 4B. As shown, the clipping mechanism 150, which disengages first, allows for the shock absorber to increase weight capacity without any structural changes to the shock absorber. In various embodiments, the clipping mechanism 150 may be designed to disengage before any of the other breakaway interfaces decouple.

FIG. 4D is a chart of the force on experienced during a fall instance in the three different cases shown in FIGS. 4A-4D. As shown, in an instance in which the shock absorber 120 of an example embodiment experiences a 50 kg weight without a clipping mechanism 150 installed (e.g., as shown in FIG. 4A), the force will increase until the first breakaway interface 135 decouples (e.g., at point 410A), causing the force to decrease as the shock absorber deforms. As shown by the 50 kg line, the user may experience less than a 3 kN force during a fall instance. Additionally, the breakaway interface 130 may also decouple at a time (e.g., at point 420A) after the breakaway interface 135 has decoupled.

As shown, in an instance in which the shock absorber 120 of an example embodiment experiences a 100 kg weight without a clipping mechanism 150 installed (e.g., as shown in FIG. 4B), the force will increase towards approximately 4 kN before breakaway interface 135 decouples (e.g., at point 410B), causing the force to decrease as the shock absorber deforms. Additionally, the breakaway interface 130 may also decouple at a time (e.g., at point 420B) after the breakaway interface 135 has decoupled.

Additionally, in an instance in which the shock absorber 120 of an example embodiment experiences a 140 kg weight with a clipping mechanism 150 installed (e.g., as shown in FIG. 4C), the force experienced will increase towards approximately 4.7 kN before the clipping mechanism 150 disengages (e.g., the clip attachment mechanism 155 may be pulled out of the clip aperture 200 at point 400C), causing the force to at least momentarily decrease as the shock absorber deforms. Additionally, the breakaway interface 135 may decouple at a time after the clip mechanism 150 has disengaged (e.g., at around 4.5 kN shown at point 410C). The breakaway interface 130 may also decouple at a time (e.g., at point 420C) after the breakaway interface 135 has decoupled. As shown, the clipping mechanism 150 being installed allows for similar forces to be experienced by a larger user (e.g., 140 kg). As shown, each of the shock absorber tests (e.g., FIG. 4A-4C) limit the force to below 5 kN, which is substantial less than the 6-8 kN limit. In various embodiments, the shock absorber 120 may be capable of withstanding higher weights with a corresponding increase in force. Therefore, the shock absorber 120 may be rated based on the weight capacity that could be held without going over 6-8 kN, for example.

FIG. 5 is a flowchart illustrating a method of manufacturing a shock absorber for a locking system in accordance with various embodiments of the present disclosure. Referring now to Block 500 of FIG. 5, the method of manufacturing the shock absorber may include creating a plurality of coils by bending a material over itself. In various embodiments, the shock absorber 120 may be a part of the braking lever 115. In various embodiments, the shock absorber 120 may be bent over itself multiple times (e.g., bends 140A, 140B). In various embodiments, the plurality of coils are made out of a single coiled material.

Referring now to Block 510 of FIG. 5, the method of manufacturing the shock absorber may include coupling the plurality of coils together by coupling a plurality of breakaway interfaces. In some embodiment, each of the plurality of breakaway interfaces (e.g., 130, 135, 150) are configured to decouple two of the plurality of coils at a different force. In some embodiments, at least one of the breakaway interfaces defines at least one deformable finger (e.g., as shown in FIG. 6A) defined on one of the plurality of coils of the shock absorber interfacing with another coil of the shock absorber.

In some embodiments, at least one of the breakaway interface (e.g., as shown in FIG. 6B) may include two hooks defined on adjacent coils, such that each of the two hooks are configured to withstand a predetermined force at which the hook decouples.

In some embodiments, at least one breakaway interface comprises a clipping mechanism 150 (e.g., as shown in FIG. 6C) configured to increase the force at which the shock absorber 120 deforms. In some embodiments, the clipping mechanism 150 is configured to fit around at least one coil of the shock absorber 120, such that the clipping mechanism 150 resists the opening force of the shock absorber. In some embodiments, the at least one breakaway interface (e.g., shown in FIG. 6C) comprising the clipping mechanism 150 further comprises a clip aperture 200 configured to receive the clipping mechanism 150. In some embodiments, the clipping mechanism 150 may be removable.

In some embodiments, the shock absorber 120 may have at least two breakaway interfaces. In an example embodiment, at least one of the breakaway interfaces may define at least one deformable finger defined on one of the plurality of coils of the shock absorber interfacing with another coil of the shock absorber (e.g., FIG. 6A) and at least one of the breakaway interfaces may include two hooks defined on adjacent coils (e.g., FIG. 6B), such that each of the two hooks are configured to withstand a predetermined force at which the hook decouples. In some embodiments, at least one of the breakaway interfaces may define at least one deformable finger defined on one of the plurality of coils of the shock absorber interfacing with another coil of the shock absorber (e.g., FIG. 6A) and at least one of the breakaway interfaces may include a clipping mechanism 150 configured to increase the force at which the shock absorber 120 deforms (e.g., FIG. 6C). In some embodiments, at least one of the breakaway interfaces may include two hooks defined on adjacent coils (e.g., FIG. 6B), such that each of the two hooks are configured to withstand a predetermined force at which the hook decouples and at least one of the breakaway interfaces may include a clipping mechanism 150 configured to increase the force at which the shock absorber 120 deforms (e.g., FIG. 6C).

In some embodiments, the shock absorber 120 may have at least three breakaway interfaces. In some embodiments, at least one of the breakaway interfaces may define at least one deformable finger defined on one of the plurality of coils of the shock absorber interfacing with another coil of the shock absorber (e.g., FIG. 6A); at least one of the breakaway interfaces may include two hooks defined on adjacent coils (e.g., FIG. 6B), such that each of the two hooks are configured to withstand a predetermined force at which the hook decouples; and at least one of the breakaway interfaces may include a clipping mechanism 150 configured to increase the force at which the shock absorber 120 deforms (e.g., FIG. 6C). In various embodiments, each of the breakaway interfaces may be configured to deform at different forces. For example, as shown and discussed with reference to FIGS. 4A-4C, the breakaway interface 135 may decouple before the breakaway interface 130. Additionally, the clipping mechanism 150 when equipped may disengage before either of the breakaway interfaces 130, 135.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of manufacturing a locking system for fall protection, the method comprising providing a shock absorber on a braking lever, the method comprising:

creating a plurality of coils by bending a material, each coil of the plurality of coils including a bending portion of the material; and coupling the plurality of coils together by coupling a plurality of breakaway interfaces, wherein each of the plurality of breakaway interfaces are configured to decouple two of the plurality of coils at a different force, wherein at least one of the breakaway interfaces defines at least one deformable finger defined on one of the plurality of coils of the shock absorber interfacing with another coil of the shock absorber.

2. The method of claim 1, further comprising providing a housing, wherein the housing defines a guide path through which the housing is slideably attached to a guide member.

3. The method of claim 1, wherein the method of manufacturing the braking lever further comprises a braking end that is configured to engage the guide member.

4. The method of claim 1, wherein at least one breakaway interface comprises a clipping mechanism configured to increase the force at which the shock absorber deforms.

5. The method of claim 4, wherein the clipping mechanism is configured to fit around at least one coil of the shock absorber, such that the clipping mechanism resists the opening force of the shock absorber.

6. The method of claim 4, wherein the at least one breakaway interface comprising the clipping mechanism further comprises a clip aperture configured to receive the clipping mechanism.

7. The method of claim 4, wherein the clipping mechanism is removable.

8. The method of claim 1, wherein the plurality of coils are made out of a single coiled material.

9. The method of claim 1, wherein at least one of the breakaway interface comprises two hooks defined on adjacent coils, such that each of the two hooks are configured to withstand a predetermined force at which the hook decouples.

10. The method of claim 1, wherein the shock absorber comprises at least:

a first breakaway interface defines at least one deformable finger defined on one of the plurality of coils of the shock absorber interfacing with another coil of the shock absorber;

a second breakaway interface defines two hooks on adjacent coils, such that each of the two hooks are configured to withstand a predetermined force at which the hook decouples; and a third breakaway interface defines a clipping mechanism configured to increase the force at which the shock absorber deforms, wherein each of the first breakaway interface, the second breakaway interface, and the third breakaway interface are configured to decouple at a different force.

11. The method of claim 1, wherein the another coil of the shock absorber includes a finger receiving aperture to receive the least one deformable finger therein.

* * * * *